Jan. 19, 1960     E. A. SACK, JR., ET AL     2,922,076
DISPLAY DEVICE
Filed Aug. 20, 1958     3 Sheets-Sheet 1
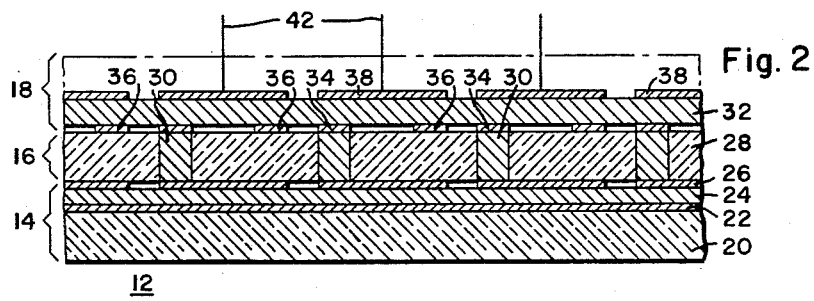
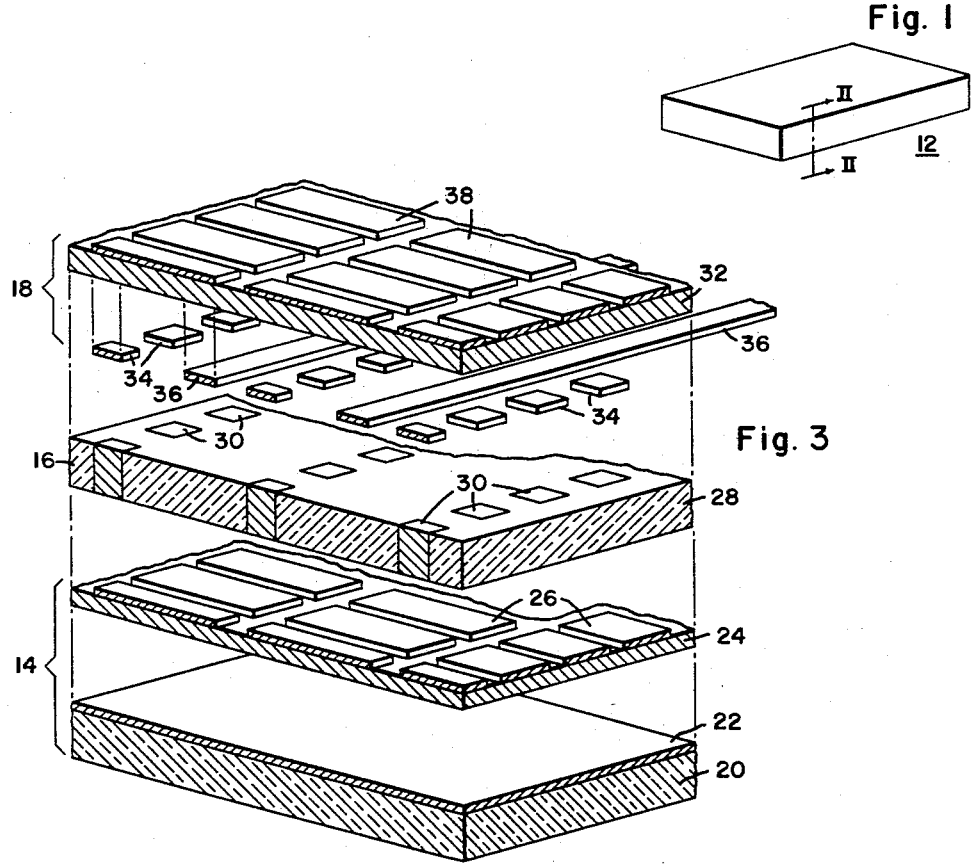
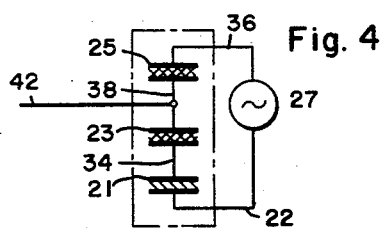
INVENTORS
Edgar A. Sack, Jr. &
Juris A. Asars Jan. 19, 1960     E. A. SACK, JR., ET AL     2,922,076
DISPLAY DEVICE
Filed Aug. 20, 1958     3 Sheets-Sheet 2
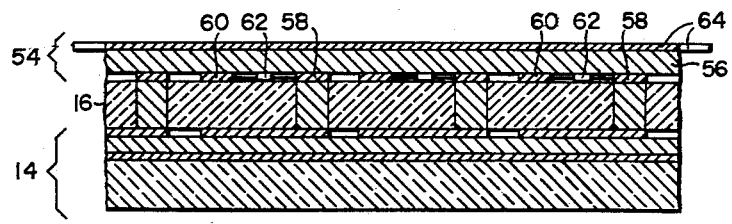
Fig. 5.
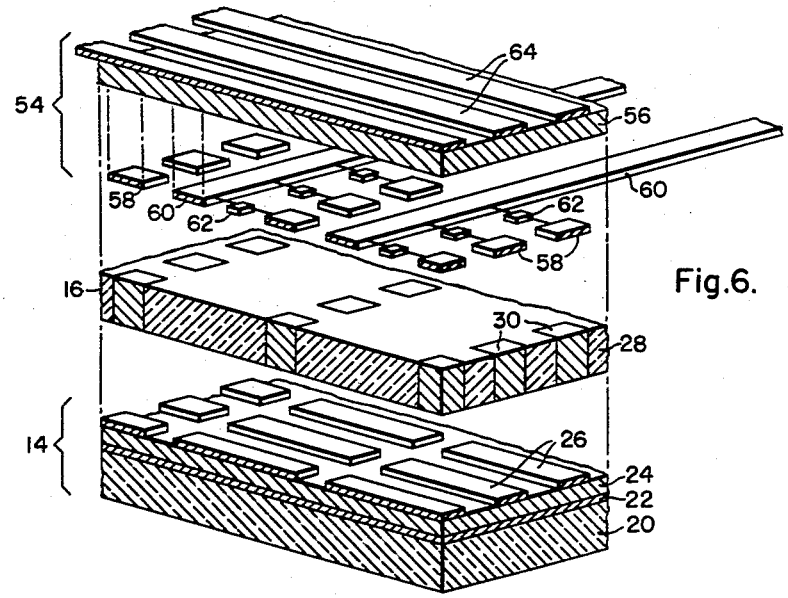
Fig. 6.
Fig. 7.
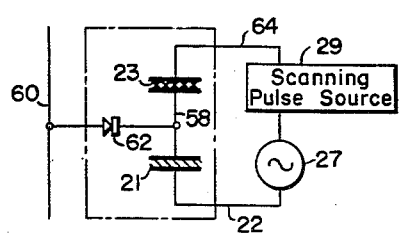

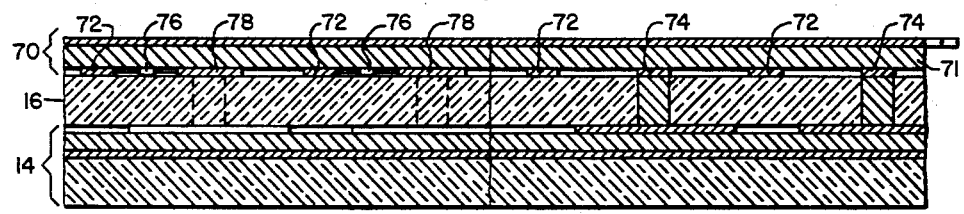
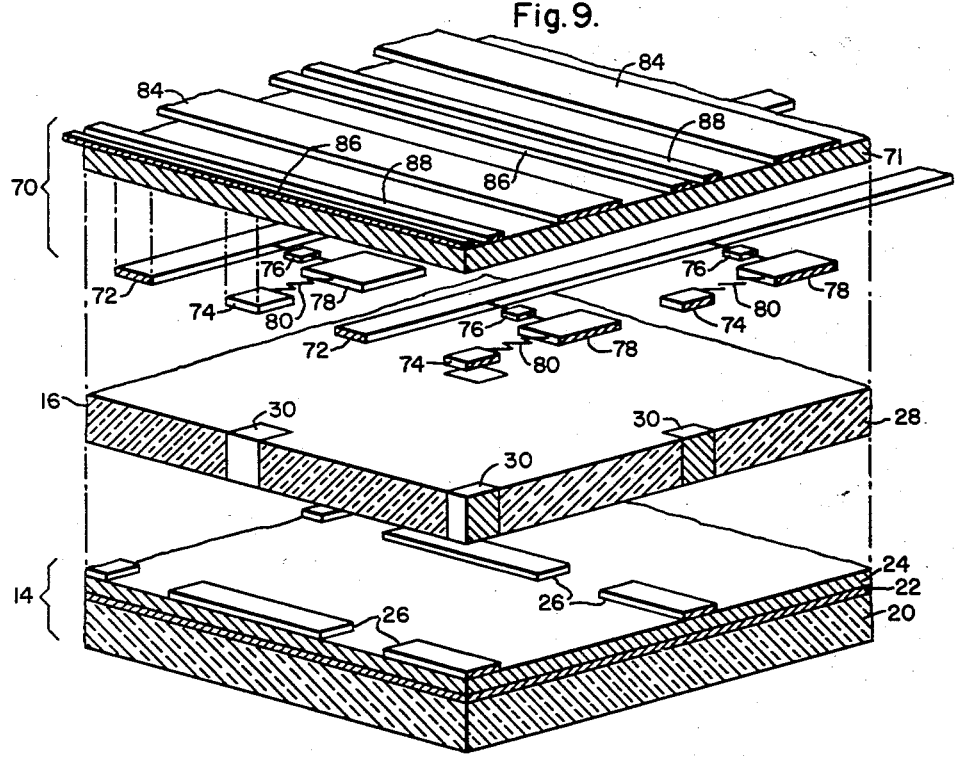
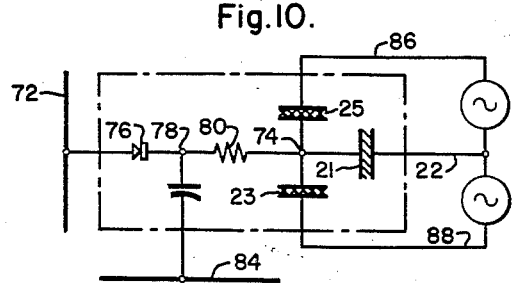

United States Patent Office 2,922,076
Patented Jan. 19, 1960

2,922,076
DISPLAY DEVICE

Edgar A. Sack, Jr., Penn Hills, and Juris A. Asars, Pittsburgh, Pa., assignors to Westinghouse Electric Corporation, East Pittsburgh, Pa., a corporation of Pennsylvania Application August 20, 1958, Serial No. 756,182

9 Claims. (Cl. 315—71)

This invention relates to display devices and more particularly to laminated structures for solid state display devices.

It has been shown in copending application Serial No. 628,421, filed December 14, 1956, entitled "Display Systems" by E. A. Sack, Jr. and assigned to the same assignee that there are several different circuit embodiments for achieving control of the light output of the individual elements of a display device. The display device is comprised of many light producing cells, such as electroluminescent cells. These circuit embodiments generally include a constant source or sources of a time varying voltage applied across an electroluminescent cell for excitation of the cell and one or more nonlinear dielectric capacitors associated with said electroluminescent cell whose effective capacitance undergoes appreciable change with the application of a direct current control potential. The capacitance changes vary the time varying potential drop across the electroluminescent cell and therefor the light output. The nonlinear dielectric capacitor may comprise a ferroelectric material such as barium titanate or barium-strontium titanate which has been shown to exhibit the referred to capacitance change.

These display systems present several problems in construction, since each screen element, in order to provide high resolution, must be small, and the formation and interconnection of individual elements is prohibitive. One possible method of fabrication is set forth in the copending application Serial No. 730,669, filed April 24, 1958, entitled "Solid State Display Screens" by P. M. G. Toulon and assigned to the same assignee. In this copending application, the nonlinear dielectric capacitors are machined from a sandwich formed of sheet nonlinear dielectric material sandwiched between sheets of conductive material. Conductive material remaining after the machining operation provides leads to external power sources as well as capacitor plates. This is a relatively delicate machining operation.

It is therefore an object of this invention to provide an improved solid state display device having high resolution.

Another object is to provide an improved solid state display device in which many elements comprise a compact unitary structure.

A further object is to provide a solid state display device having means of applying control and light power potentials which are inherent in the device structure rather than having additional leads applied to each element.

Still another object is to provide a flat solid state display screen which is compact and of durable construction and to which external connections may be made conveniently.

It is another object to provide an improved method of fabricating a solid state display device.

These and other objects will be apparent from the following description taken in accordance with the accompanying drawing throughout which like reference characters indicate like parts and in which:

Figure 1 illustrates a large area display screen embodying our invention;

Fig. 2 shows an enlarged cross sectional view of Fig. 1 illustrating a "three-component" type screen embodying our invention;

Fig. 3 illustrates an exploded perspective view of the structure of Fig. 2;

Fig. 4 illustrates the equivalent circuit of the embodiment of Fig. 2;

Fig. 5 illustrates in cross section a modification of our invention embodying a "two-component" type screen;

Fig. 6 illustrates an exploded perspective view of the structure shown in Fig. 5;

Fig. 7 illustrates the equivalent circuit of the embodiment of Figs. 5 and 6;

Fig. 8 shows in cross section another modification of our invention in which a "bridge-type" control system is embodied;

Fig. 9 illustrates an exploded perspective view of the structure shown in Fig. 8; and Fig. 10 shows the equivalent circuit of the structure of Figs. 8 and 9.

Referring to Figs. 1, 2, 3 and 4, there is shown one embodiment of our invention. The structure or display screen 12 may be considered to be comprised of three portions: a light producing portion 14, a connective layer 16, and a control portion 18 arranged in the order named commencing from the viewing side of the display screen 12. Throughout the ensuing discussion, the viewing side of the display screen will be considered the front side and the control side will be considered the back side.

The light producing portion 14 comprises a light transmissive support member 20 onto which is applied, in the following order, a light transmissive front electrode 22 of electrically conductive material in a continuous layer, an electroluminescent material 24 in a continuous layer, and a mosaic layer of back electrodes 26 in a discontinuous and elemental configuration.

The light transmissive support member 20 may be of any suitable material such as glass. The light transmissive front electrode 22 is a suitable electrical conductive material such as tin oxide applied thereon by heating the glass above room temperature and depositing a layer of tin chloride on the heated glass in an atmosphere containing oxygen. Chlorine gas will evolve leaving a film of tin oxide adhering to the glass.

The electroluminescent material in layer 24 is generally composed of a suitable phosphor material exhibiting the property of electroluminescence embedded in a suitable dielectric material. The phosphors which exhibit the property of electroluminescence are known as electroluminophors. Examples of suitable phosphors for this application are zinc sulfide-copper and manganese activated, and zinc sulfide-copper activated, to mention a few of these well-known phosphors. The phosphor material may be dispersed within a suitable plastic dielectric or an inorganic material such as glass. Suitable methods of forming such a layer may be found in our previously mentioned copending application Serial No. 628,421. A suitable phosphor such as zinc sulfide activated by copper may be admixed with a suitable solvent such as butyl acetate and with polyvinyl chloride lacquer. The back electrodes 26 may be formed by evaporating a suitable electrically conductive material such as aluminum onto the layer of electroluminescent material 24 through a suitable mask. Each back electrode 26, in combination with the other component layers of the electroluminescent cell 14, forms a single light producing element or area. To produce a display device having sufficiently high resolution, the area of one back electrode 26, and hence of one light producing element, is about 100 square mils. The electroluminescent light producing device is discussed more fully in an article entitled "Electroluminescence and Related Topics" by G. Destriau and H. F. Ivey in the December 1955 issue of the Proceedings of the I.R.E.

By way of explanation, electroluminescence was first completely disclosed by G. Destriau in London, Edinburgh and Dublin Philosophical Magazine, Series 7, volume 38, No. 285, pages 700–737 (October 1947), article titled "The New Phenomenon of Electrophotoluminescence." In the phenomenon of electroluminescence, selected phosphor materials are placed within the influence of an electric field, such as by sandwiching the phosphor material between two spaced electrodes and applying an alternating potential between these electrodes. The resulting electric field which is created across the electrodes excites the phosphor material to luminescence, and the phosphor materials which display this electroluminescence are thus termed "field responsive." Such phosphor materials are normally admixed with a dielectric material, or a separate layer of dielectric material is included between the electrodes, in order to prevent any arcing thereacross which would short out the electroluminescent cell, but a separate dielectric material is only desirable and not mandatory for the cells may be operated under some conditions without any dielectric where the applied electric field is as high as 100 kv. per centimeter. Normally the spaced electrodes are parallel, but they need not be, as where graded field intensities are desired.

An electroluminescent cell, substantially equivalent to that just previously described, is a common component of the various embodiments of the present invention. The remainder of the structure of each embodiment is a means of controlling the light output of the plurality of light producing elements of the electroluminescent cell.

Our invention generally comprises a screen structure having an electroluminescent layer with elemental back electrodes forming many individual light producing elements in a unitary structure. A layer of nonlinear dielectric material having electrodes, bus bars, and perhaps other components of a control and signal distribution scheme printed or otherwise deposited thereon is applied to the electroluminescent layer.

Referring again to Figs. 1, 2, 3 and 4, the connective layer 16 and control layer 18 embody a "three-component" screen as described in the copending application Serial No. 628,421. The middle or connective layer 16 comprises an insulating material 28 through which is formed a mosaic of conducting pillars or connective electrodes 30. The insulating material 28 may be a resin, plastic or glass. The connective electrodes 30 may be a metal or a suitable electrically conductive plastic, rubber, or varnish. As a specific example of a means of forming the layer 16, electrically conducting rubber to form electrodes 30 could be poured into a glass honey comb 28. The opening in the glass can be made by etching. The apertured glass member 28 may be purchased commercially. A method of preparing the apertured glass member is given in an article entitled "Chemical Machining of Photosensitive Glass" by S. D. Stookey on page 115 of the January 1953 issue of Industrial and Engineering Chemistry. The configuration or pattern of connective electrodes 30 is such that each such electrode may be attached to an individual back electrode 26 of the electroluminescent cell 14. In the specific embodiment, the electrodes 30 are arranged in parallel rows and equally spaced in each row.

The control portion 18 comprises a layer 32 of a nonlinear dielectric ceramic material. The nonlinear dielectric material in layer 32 may be of any suitable material such as ferroelectric dielectric material selected from the group which includes, for example, barium titanate, barium-strontium titanate, barium stannate, sodium columbate, sodium tantalate, potassium columbate and potassium tantalate. An ideal or lossless nonlinear dielectric material may be defined as a material in which the functional relationship between the electric displacement in a given principal direction and the electric field in the same direction while single valued is not that of a straight line in Cartesian coordinates. One particular class of materials that has been found satisfactory in this application is ferroelectric dielectric materials. The preparation of titanate ceramics is fully disclosed in an article entitled "Preparation of Reproducible Barium Titanate" by R. M. Callahan and J. F. Murray, page 131 of the May 1954 issue of the "Bulletin" of the American Ceramic Society.

The dielectric layer 32 has on its front surface an electrode configuration comprising a pattern of connective contacts or elements 34 of electrically conductive material, which are in substantial alignment with connective electrodes 30 of connective layer 16. In the specific embodiment, the elements 34 are in parallel rows and equally spaced in each row. A plurality of parallel strips 36 of electrically conductive material are also provided with a strip positioned between each row of elements 34. The strips 36 extend across the screen 12 or a portion of it.

On the back side of the dielectric layer 32 is a pattern of control electrodes 38 of suitable electrically conductive material. The pattern of electrodes 38 is similar to that of the pattern of back electrodes 34 on the opposite side of the layer 32 and of similar number. The electrodes or contacts 38 may be formed on the nonlinear dielectric ceramic layer 32 by known methods such as evaporating an electrically conductive material such as silver through a mask or by spraying a silver-glass frit paint through a mask and firing it. Silk screen methods have been found to be quite applicable. The contacts 34 and strips 36 on the opposite side of the layer 32 may be formed in a similar manner. The contacts 38 are arranged to provide a contact directly opposite one of the contacts 34 and also directly opposite a portion of one of the adjoining strips 36.

The structure shown in Figs. 1, 2, and 3 is termed a three-component screen because each screen element comprises one light producing electroluminescent cell 21 and two nonlinear dielectric capacitors 23 and 25 as illustrated in Fig. 4. The nonlinear dielectric capacitor 23 is formed between the control electrode 38 and the contact 34, and the other dielectric capacitor 25 is formed between the control electrode 38 and the strip electrodes 36.

The equivalent circuit shown in Fig. 4 represents a single element of the display screen and is shown enclosed by dotted lines. In operation a light power source 27 of about 400 volts at 3000 cycles per second is provided. The source 27 has one terminal connected to the front electrode 22 of the electroluminescent cell 21 and the other turns to strips or buses 36 of the control portion 18. Control leads 42 connect each element of the display screen to a signal distribution means (not shown) which will in turn distribute an applied direct current control signal, such as a video signal, to each element. A more detailed description of the operation of the device shown in Figs. 1, 2, 3 and 4 may be found in the previously mentioned copending application Serial No. 628,421.

The portions 14, 16 and 18 of the laminated screen may be held together by any suitable glue or resin such as diethylene triamine epoxy resin. This material is nonconductive and forms a strong mechanical bond without altering the electrical properties of the structure. To connect electrodes, a conductive adhesive such as described in Electrical Manufacturing for June 1958 on page 148 may be used to improve contact between the electrodes. A suitable conductive varnish is one made by weight of 12.5 parts carbon black, 200 parts varnish, 60 parts of a solvent such as benzene and one part of a drier such as cobalt naphthenate or lead naphthenate. Mechanical tabs, fasteners, or clamps which penetrate or encompass the structure may also be used to hold the layers together.

In Figs. 5, 6 and 7 there is shown another embodiment of our invention in which a screen of "two-component" element type, which is also described in the previously mentioned copending application Serial No. 628,421, is formed in a laminated structure. The general structure is similar to that in Figs. 2 and 3 having the electroluminescent light producing portion 14, the connective layer 16, and a control portion 54 modified. There is, however, an additional problem in forming a screen in this manner. This additional problem is that a "two-component" configuration does not readily lend itself to a structure in which control signals may be applied at convenient external points.

The control portion 54 consists of a dielectric layer 56 of a nonlinear dielectric material. The layer 56 is of similar material as that in layer 32. The front of the dielectric layer 56 has applied thereto conductive contacts 58. Strip electrodes 60, and diodes 62 must be separated from the nonlinear dielectric material 56 by an insulating material such as resin or plastic. A layer of diethylene triamine epoxy resin is suitable. This material has a low dielectric constant relative to the ferroelectric material and will lower the parasitic capacitance. The diodes 62 connect each contact 58 with one of the adjoining strip electrodes 60. The back of the control layer 56 has parallel conductive strips 64 which are perpendicular to the direction of strip electrodes 60. The strips are positioned so that they are opposite to a contact 58 in each row to form a plurality of capacitors.

The structure shown in Figs. 5 and 6 besides embodying a two-component screen in addition has part of a signal distribution means inherent and integral in the structure. This is provided by the rectifiers or diodes 62 which form, with electrodes 58, 60 and 64, a distribution matrix such that input control signals are sequentially supplied to the elements of the screen.

The diodes 62 may be printed on the front of the nonlinear dielectric layer 56 with insulating material between the diode 62 and the layer 56 to prevent parasitic capacitance and may be of a semiconductor material such as selenium, silicon or germanium.

Fig. 7 shows the equivalent circuit for the structure shown in Figs. 5 and 6. That portion representing one element of the display screen is enclosed by dotted lines. The source 27 provides the necessary excitation power for the electroluminescent cell, and the vertical scanning pulse source 29 may be separate from the screen itself, connected only by conductive leads. The vertical scanning pulse source 29 causes the control signal, which is applied to the vertical buses 60 of the screen, to be successively applied to a particular row of elements.

Figs. 8, 9 and 10 illustrate another modification of Fig. 2, and the control scheme inherent in the laminated structure of this embodiment is a bridge circuit configuration such as that described in U.S. Patent No. 2,875,380, issued February 24, 1959, entitled "Display Systems," by P. M. G. Toulon and assigned to the same assignee. Light producing portion 14 and connective layer 16 are similar to those in Fig. 2. In Figs. 8 and 9, a control portion 70 is provided having a dielectric layer 71 of similar material as layer 32. The layer 71 has on its front surface a pattern of printed parallel buses 72 and conductive contacts 74 similar to Fig. 2, there being one such bus 72 for each column of screen elements. Insulating material as previously described is necessary between buses 72 and layer 71 to reduce parasitic capacitance. A plurality of conductive elements 78 are also provided on the front surface of the layer 71 such that a conductive element 78 is provided adjacent to each conductive element 74 in each column. For each individual contact or element 78 in a column, a diode 76 is connected from the bus 72. The contact 78 provides one electrode of a capacitor in which the dielectric layer 71 is the dielectric. The other electrode forming this capacitor is on the back surface of the control layer 71 and will be described hereinafter. A printed resistive element 80 is connected from each capacitive electrode 78 to an associated electrode contact 74. The contact 74 is in electrical contact with the connective electrodes 30 of the connective layer 16. The diodes 76, resistive elements 80 and electrodes 74 and 78 are shown as being exemplary of the complexity of a circuit which may be inherent in a display device constructed according to our invention.

The back surface of the control layer 71 has thereon a series of parallel strips or buses 84, 86 and 88 which run perpendicularly to the strips 72 on the front surface. One of the buses 84 is opposite an electrode 78 in each row on the front surface and extends across the layer 71 or a portion of it, to provide a common capacitor plate to all the opposite contacts 78. The other strips 86 and 88 on the back surface provide means of connecting to light power sources which are apart from the main screen structure. A strip 86 and a strip 88 are positioned directly opposite an electrode 74 in each row and extend across the layer 71.

While we have shown our invention in only a few forms, it will be obvious to those skilled in the art that it is not so limited but is susceptible of various other changes and modifications without departing from the spirit and scope thereof.

We claim as our invention:

1. A laminated display device comprising a plurality of contiguous laminated layers, said device including a light producing continuous layer of electroluminescent material having a continuous electrical coating on one surface and a first group of elemental contact areas of a predetermined pattern on the other surface, a control layer comprising a layer of ferroelectric material having a second group of contact areas on one surface facing the surface of said light producing layer on which said first group of contact areas are positioned and of similar pattern as said first group of contact areas, and means positioned between said electroluminescent layer and said ferroelectric layer to provide electrical connection between corresponding contact areas of said first and second group of contact areas.

2. A laminated display screen comprising a plurality of elemental display areas, said screen comprising a layer of electroluminescent material having a plurality of first elemental electrodes on one surface thereof in a given configuration, a control structure comprising a layer of nonlinear dielectric material having a plurality of second elemental electrodes on one surface facing the surface of said electroluminescent layer on which said first electrodes are positioned and of similar configuration as said first electrodes on said electroluminescent screen, means for electrically joining each of said first electrodes to a corresponding second electrode, said means comprising an insulating layer having a plurality of electrically conductive pillars extending therethrough.

3. A laminated display device comprising a continuous electroluminescent layer having a continuous electrically conductive electrode on one surface thereof, and a first group of elemental electrically conductive electrodes on the other surface, a nonlinear dielectric continuous layer having on the side facing said electroluminescent layer a second group of elemental electrodes which connect with the elemental electrodes of said electroluminescent layer, a plurality of strip electrodes provided on the same surface of said nonlinear dielectric layer as said second group of electrodes and insulated from said first and second groups of electrodes, a third group of elemental electrode members provided on the opposite surface of said nonlinear dielectric layer with respect to said second group of such a pattern that each of the electrodes of said third group provides a common capacitor plate of each of two capacitors, said two capacitors having said common plate as one plate and one of said strip electrodes and one of the electrodes of said second group of electrodes as the opposing plates.

4. A laminated display screen comprising a light producing member comprised of a plurality of separate controllable light producing areas, said light producing member comprising a continuous layer of electroluminescent phosphor sandwiched between a front and a back electrode, said front electrode comprising a continuous layer of electrically conductive material transmissive to radiation emitted from said phosphor layer, a terminal connected to said front electrode for connection to one terminal of a potential source for providing the necessary excitation potential for said phosphor layer, said back electrode comprised of a first group of spaced insulated electrically conductive contacts positioned substantially in parallel rows on the surface of said phosphor layer, a control structure for said light producing member comprising a continuous sheet of nonlinear dielectric material of similar area as said phosphor layer, a second group of electrically conductive contacts positioned in parallel rows and of similar number and aligned with said first group of contacts, means for connecting the contacts of said first group to corresponding contacts of said second group, a plurality of electrical conductive strips provided on the same surface of said dielectric layer as said second group of contacts, said strips parallel and positioned so as to provide a strip between each row of conductive elements and insulated therefrom, said strips electrically connected together and provided with a terminal connected to the other terminal of said excitation source, and a third group of electrically conductive contacts provided on the opposite surface of said dielectric layer with respect to said second group to which a control potential may be applied to control the associated light producing elements.

5. A display screen comprising a light producing member comprised of a plurality of separate controllable light producing areas, said light producing member comprising a continuous layer of electroluminescent phosphor sandwiched between a front and a back electrode, said front electrode comprising a continuous layer of electrically conductive material transmissive to radiation emitted from said phosphor layer, a terminal connected to said front electrode for connecting to one terminal of a potential source for providing the necessary excitation potential for said phosphor layer, said back electrode comprised of a first group of spaced electrically conductive contacts positioned substantially in parallel rows on the surface of said phosphor layer, a control structure for said light producing member comprising a continuous sheet of nonlinear dielectric material of similar area as said phosphor layer, a second group of electrically conductive contacts in parallel rows, said second group of contacts of similar number and aligned with said first group, means for electrically connecting the contacts of said first group to corresponding contacts of said second group, a first group of electrical conductive strips provided on the same surface of said dielectric layer as said second group of contacts, said first group of strips parallel and positioned so as to provide a strip between each row of conductive contacts and insulated therefrom, a rectifying device connected between each contact of said second group of contacts and one of the adjoining conductive strips of said first group of strips, means for applying control potential to said first group of strips, a second group of parallel conductive strips positioned on the opposite surface of the dielectric layer with respect to said first group of strips, said second group of strips at a right angle to said first group of strips and positioned opposite to a contact in each row of the second group of contacts.

6. A display screen comprising a light producing member comprised of a plurality of separate controllable light producing areas, said light producing member comprising a continuous layer of electroluminescent phosphor sandwiched between a front and a back electrode, said front electrode comprising a continuous layer of electrically conductive material transmissive to radiation emitted from said phosphor layer, a terminal connected to said front electrode for connection to the common terminal of a first and second potential source for providing the excitation potential for said phosphor layer, said back electrode comprised of a first group of spaced electrically conductive contacts positioned substantially in parallel rows and equally spaced on the surface of said phosphor layer, a control structure for said light producing member comprising a continuous sheet of nonlinear dielectric material of similar area as said phosphor layer, a second group of electrically conductive contacts positioned on said dielectric layer facing said phosphor layer in substantially parallel rows and equally spaced in each row, said second group of contacts of similar number and aligned with said first group, means for electrically connecting the contacts of said first group to corresponding contacts of said second group, a third group of electrically conductive contacts positioned on the same surface of said dielectric layer as said first group, the contacts of said third group positioned in the rows of said second group such that the contacts of said second and third groups alternate, a plurality of electrical conductive strips provided on the same surface of said dielectric layer as said second group of contacts, said first group of strips parallel and positioned so as to provide a strip between each row of conductive contacts and insulated therefrom, a rectifying device connected between each contact of said third group of contacts and one of the adjoining conductive strips of said first group of strips, means for applying control potentials to said first group of strips to control light emission from said light producing areas, a second group of parallel conductive strips positioned on the opposite surface of said dielectric layer with respect to said first group of strips, said second group of strips at a right angle to said first group and positioned opposite to a contact in each row of said third group of contacts to form a capacitor, a third and fourth group of parallel conductive strips parallel to said second group of conductive strips, a strip of both the third and fourth group positioned between each adjoining pair of strips of said second groups of strips, said strips of said third and fourth groups positioned opposite to a contact in each row of said second group of contacts to form two capacitors with the contact a common plate, said third group of strips electrically connected together and provided with a terminal connected to the other terminal of said first potential source and said fourth group of strips electrically connected together and provided with a terminal connected to the other terminal of said second potential source.

7. A display screen comprising a light producing member comprised of a plurality of separate controllable light producing areas, said light producing member comprising a continuous layer of electroluminescent phosphor sandwiched between a front and a back electrode, said front electrode comprising a continuous layer of electrically conductive material transmissive to radiation emitted from said phosphor layer, a terminal connected to said front electrode for connection to the common terminal of a first and second potential source for providing the excitation potential for said phosphor layer, said back electrode comprised of a first group of spaced electrically conductive contacts positioned substantially in parallel rows and equally spaced on the surface of said phosphor layer, a control structure for said light producing member comprising a continuous sheet of nonlinear dielectric material of similar area as said phosphor layer, a second group of electrically conductive contacts positioned on said dielectric layer facing said phosphor layer in substantially parallel rows and equally spaced in each row, said second group of contacts of similar number and aligned with said first group, means for electrically connecting the contacts of said first group to corresponding contacts of said second group, said means comprising a layer of insulating material having a plurality of conducting pillars therein, a third group of electrically conductive contacts positioned on the same surface of said dielectric layer as said first group, the contacts of said third group positioned in the rows of said second group such that the contacts of said second and third groups alternate, a plurality of electrical conductive strips provided on the same surface of said dielectric layer as said second group of contacts, said first group of strips parallel and positioned so as to provide a strip between each row of conductive contacts and insulated therefrom, a rectifying device connected between each contact of said third group of contacts and one of the adjoining conductive strips of said first group of strips, means for applying control potentials to said first group of strips to control light emission from said light producing areas, a second group of parallel conductive strips positioned on the opposite surface of said dielectric layer with respect to said first group of strips, said second group of strips at a right angle to said first group and positioned opposite to a contact in each row of said third group to form a capacitor, a third and fourth group of parallel conductive strips parallel to said second group of conductive strips, a strip of each the third and fourth groups positioned between each adjoining pair of strips of said second group of strips, said strips of said third and fourth groups positioned opposite to a contact in each row of said second group of contacts to form two capacitors with the contact a common plate, said third group of strips electrically connected together and provided with a terminal connected to the other terminal of said first potential source and said fourth group of strips electrically connected together and provided with a terminal connected to the other terminal of said second potential source.

8. A display screen comprising a light producing member comprised of a plurality of separate controllable light producing areas, said light producing member comprising a continuous layer of electroluminescent phosphor sandwiched between a front and a back electrode, said front electrode comprising a continuous layer of electrically conductive material transmissive to radiation emitted from said phosphor layer, a terminal connected to said front electrode for connection to the common terminal of a first and second potential source for providing the excitation potential for said phosphor layer, said back electrode comprised of a first group of spaced electrically conductive contacts positioned substantially in parallel rows and equally spaced on the surface of said phosphor layer, a control structure for said light producing member comprising a continuous sheet of nonlinear dielectric material of similar area as said phosphor layer, a second group of electrically conductive contacts positioned on said dielectric layer facing said phosphor layer in substantially parallel rows and equally spaced in each row, said second group of contacts of similar number and aligned with said first group, means for electrically connecting the contacts of said first group to corresponding contacts of said second group, said means comprising a layer of insulating material having a plurality of apertures therein, each of said apertures filled with an electrically conductive material, a third group of electrically conductive contacts positioned on the same surface of said dielectric layer as said first group, the contacts of said third group positioned in the rows of said second group such that the contacts of said second and third groups alternate, a plurality of electrical conductive strips provided on the same surface of said dielectric layer as said second group of contacts, said first group of strips parallel and positioned so as to provide a strip between each row of conductive contacts and insulated therefrom, a rectifying device connected between each contact of said third group of contacts and one of the adjoining conductive strips of said first group of strips, means for applying control potentials to said first group of strips to control light emission from said light producing areas, a second group of parallel conductive strips positioned on the opposite surface of said dielectric layer with respect to said first group of strips, said second group of strips at a right angle to said first group and positioned opposite to a contact in each row of said third group to form a capacitor, a third and fourth group of parallel conductive strips parallel to said second group of conductive strips, a strip of each the third and fourth groups positioned between each adjoining pair of strips of said second group of strips, said strips of said third and fourth groups positioned opposite to a contact in each row of said second group of contacts to form two capacitors with the contact a common plate, said third group of strips electrically connected together and provided with a terminal connected to the other terminal of said first potential source and said fourth group of strips electrically connected together and provided with a terminal connected to the other terminal of said second potential source.

9. A method of fabricating a display device of sheet-like construction comprising the steps of producing a sheet-like element of dielectric material, providing a plurality of electrically conductive elements on both surfaces of said dielectric sheet, producing a sheet-like element of electroluminescent phosphor, providing said phosphor layer with a plurality of conductive electrodes on one surface, applying an insulating glue between said members and pressing said members together so that the conductive elements on one surface of said dielectric layer are in contact with the electrodes on said phosphor layer.

References Cited in the file of this patent

UNITED STATES PATENTS 2,792,447     Kazan                May 14, 1957
2,818,531     Peek                 Dec. 31, 1957

OTHER REFERENCES

"An Improved High-Gain Panel Light Amplifier," by B. Kazan, Proceedings of the I.R.E., October 1957, pages 1358–1364.